(12) United States Patent
Jeganathan et al.

(10) Patent No.: US 9,924,019 B2
(45) Date of Patent: Mar. 20, 2018

(54) AUTOMATIC DEVICE PAIRING

(71) Applicant: Microsoft Technology Licensing, LLC, Redmond, WA (US)

(72) Inventors: Joy Gilbert Jeganathan, Longmont, CO (US); Tejas Mistry, Sammamish, WA (US); Justin Coppin, Windosor, CO (US); Alain Michaud, Quebec (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/714,029

(22) Filed: May 15, 2015

(65) Prior Publication Data

US 2016/0337496 A1 Nov. 17, 2016

(51) Int. Cl.
*H04B 1/38* (2015.01)
*H04M 1/725* (2006.01)
*H04W 76/02* (2009.01)
*H04W 4/00* (2018.01)
*G06F 3/0354* (2013.01)

(52) U.S. Cl.
CPC ...... *H04M 1/7253* (2013.01); *G06F 3/03545* (2013.01); *H04W 4/008* (2013.01); *H04W 76/023* (2013.01)

(58) Field of Classification Search
CPC .............. G06F 3/03545; G06F 3/0321; G06F 3/04883; G06F 3/0416; G06F 3/0383; G06F 3/0488; G06F 3/017; G06F 21/445; G06F 21/83; G06F 2200/1632; G06F 2203/04807; G06F 3/0231; G06F 17/241; G06F 1/1643
See application file for complete search history.

(56) References Cited

U.S. PATENT DOCUMENTS 6,282,407 B1 8/2001 Vega et al.
7,174,130 B2 2/2007 Kurisko et al.
(Continued)

FOREIGN PATENT DOCUMENTS

EP 2428874 A1 3/2012
WO 20140133312 A1 4/2014

OTHER PUBLICATIONS

International Search Report and Written Opinion dated Aug. 2, 2016 from PCT Patent Application No. PCT/US2016/028001, 15 pages.
(Continued)

*Primary Examiner* — Kwasi Karikari
(74) *Attorney, Agent, or Firm* — Rainier Patents, P.S.

(57) ABSTRACT

The description relates to device pairing. One example can involve a computing device (e.g., companion device) and a stylus. The companion device can have a display and be configured to communicate in accordance with a wireless protocol. The stylus can be configured to transmit proximity information to the computing device when a user brings a tip of the stylus proximate to the display and be configured to supply wireless protocol identification information with the proximity information. The computing device can be configured to pair with the stylus over the wireless protocol using the wireless protocol identification information without requiring any additional action from the user on the computing device or the stylus.

26 Claims, 5 Drawing Sheets

(56) References Cited

U.S. PATENT DOCUMENTS

| | | |
|---|---|---|
| 7,551,593 B2 | 6/2009 | Haller et al. |
| 7,907,901 B1 | 3/2011 | Kahn et al. |
| 8,213,613 B2 | 7/2012 | Diehl et al. |
| 8,442,549 B2 | 5/2013 | Niranjan et al. |
| 8,666,313 B2 | 3/2014 | Preston et al. |
| 8,928,635 B2 | 1/2015 | Harley et al. |
| 2008/0057868 A1 | 3/2008 | Chang |
| 2008/0150917 A1 | 6/2008 | Libbey et al. |
| 2011/0028091 A1 | 2/2011 | Higgins et al. |
| 2011/0081860 A1 | 4/2011 | Brown et al. |
| 2013/0106722 A1 | 5/2013 | Shahparnia et al. |
| 2013/0189924 A1 | 7/2013 | Pedro et al. |
| 2013/0203353 A1 | 8/2013 | Kim et al. |
| 2014/0043245 A1 | 2/2014 | Dowd et al. |
| 2014/0125575 A1 | 5/2014 | Samanta Singhar |
| 2014/0157135 A1 | 6/2014 | Lee et al. |
| 2014/0176495 A1 | 6/2014 | Vlasov |
| 2014/0253467 A1 | 9/2014 | Hicks et al. |
| 2014/0256250 A1 | 9/2014 | Cueto et al. |
| 2014/0340328 A1* | 11/2014 | Kameyama .......... G06F 3/03545 345/173 |
| 2015/0050879 A1* | 2/2015 | MacDuff ............... H04W 12/06 455/39 |
| 2015/0277587 A1* | 10/2015 | Chandran ............. G06F 3/0416 345/173 |

OTHER PUBLICATIONS

"Jot Touch 4 Support", Published on: Mar. 26, 2013; Available at: <<http://www.adonit.net/support/jot-touch-4/>>.

"Pencil Think with Your Hands", Fifty Three, Inc., Online at <<http://www.fiftythree.com/pencil>>; retrieved Apr. 27, 2015, 14 pages.

International Preliminary Report on Patentability dated Aug. 10, 2017 from PCT Patent Application No. PCT/US2016/028001, 11 Pages.

Written Opinion of the International Preliminary Examining Authority dated May 10, 2017 from PCT Patent Application No. PCT/US2016/028001, 10 pages.

* cited by examiner

AUTOMATIC DEVICE PAIRING

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DESCRIPTION

The present concepts relate to electronic or active styluses (hereinafter, "styluses") and easy pairing of the styluses to companion display devices (hereinafter, "companion devices"), such as tablets or phones. Users that buy a stylus with their companion device expect the stylus to work with the companion device. User satisfaction is quickly diminished if the user has to read instructions and take various non-intuitive actions to get the stylus and companion device to operate cooperatively. The present concepts provide several seamless solutions so that from the user's perspective the stylus and the companion device work as expected with little or no user intervention/involvement.

Figure 1:
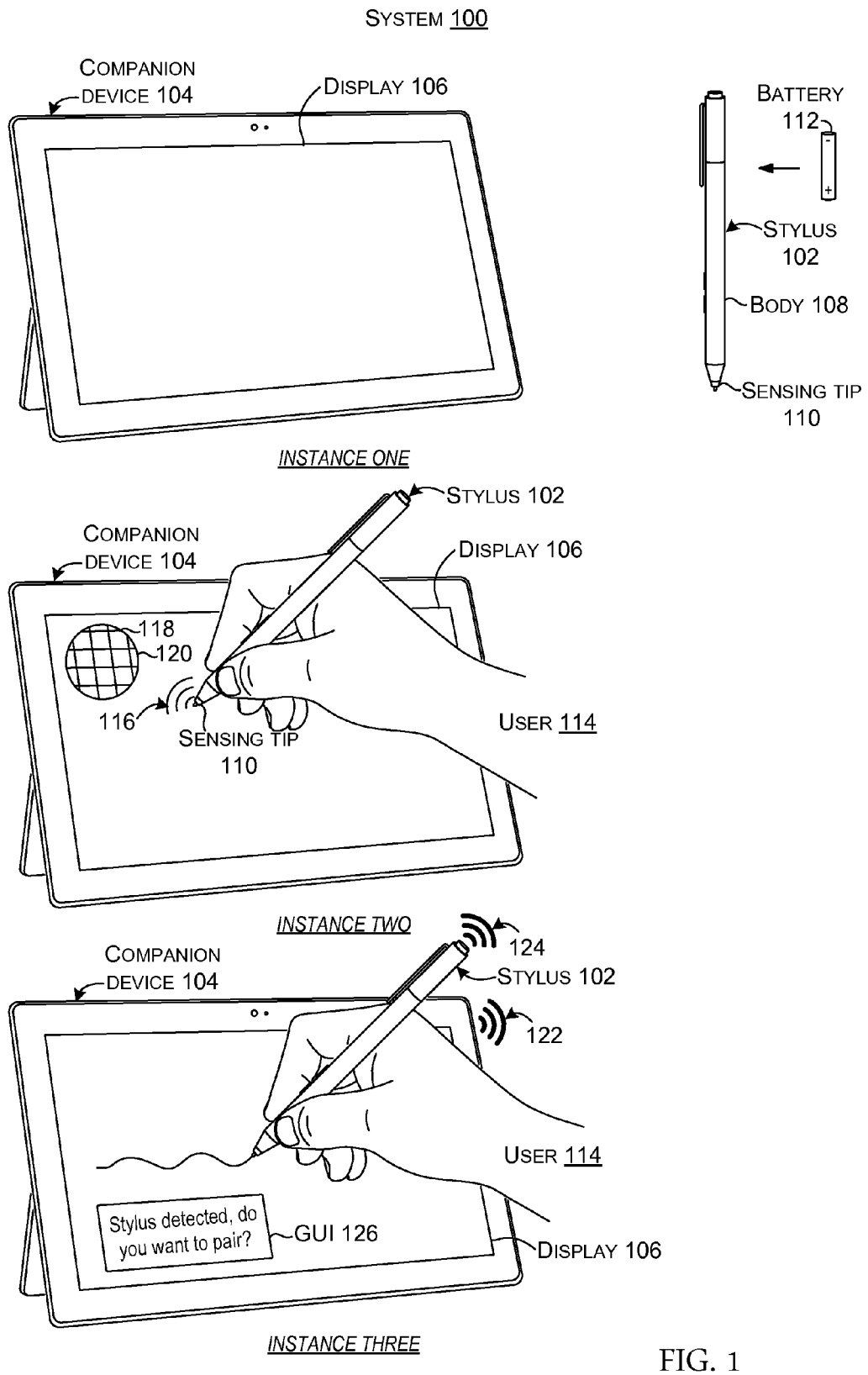
FIGS. 1-2 collectively show example use case scenarios in accordance with some implementations of the present concepts.
Figure 2:
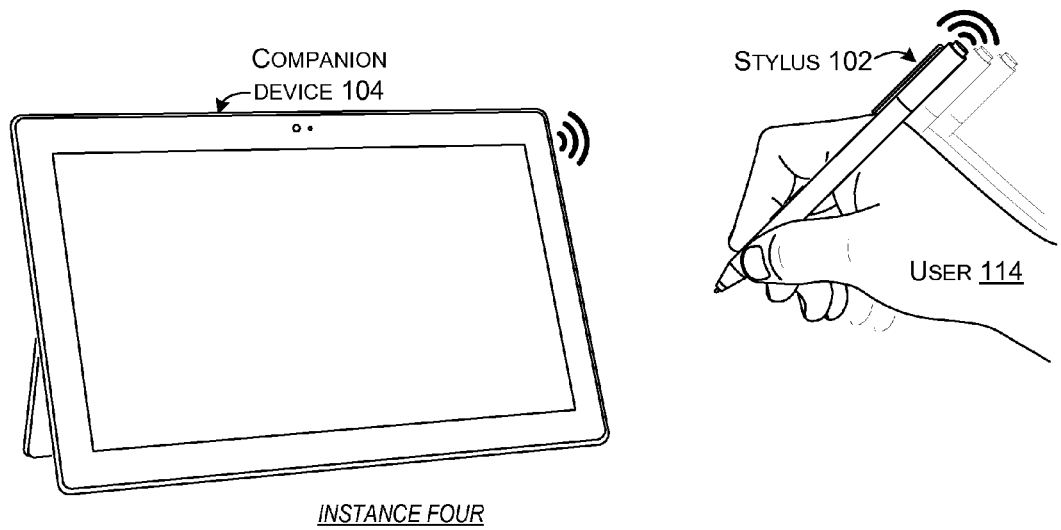
Figure 2:
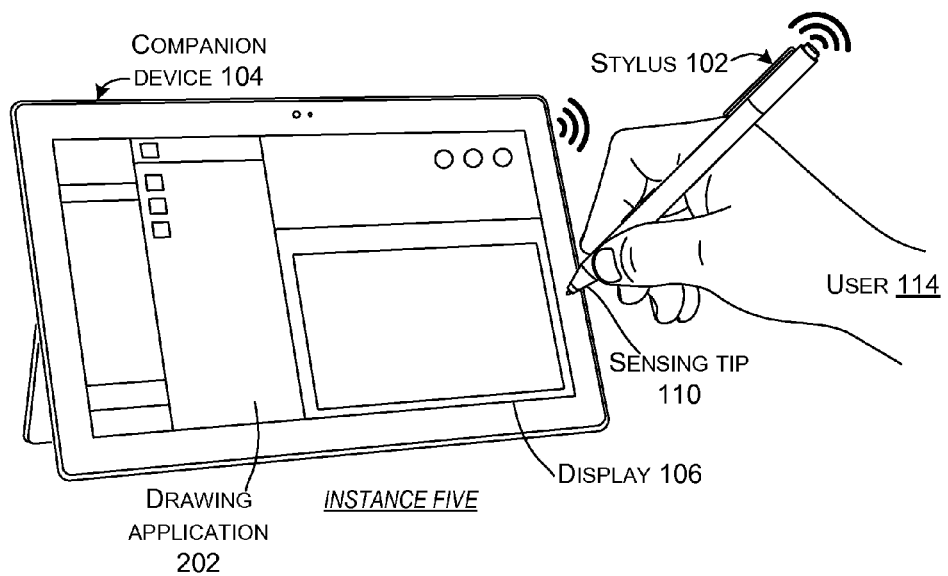

FIGS. 1-2 collectively illustrate a use case scenario explained relative to system 100. In this case, system 100 involves a stylus 102 and a companion device (e.g., computing device) 104 having a display 106. The stylus 102 includes a body 108, a sensing tip 110, and a power source, such as a battery 112.

For purposes of explanation, this scenario begins relative to Instance One when a user 114 powers up the stylus 102 for the first time, such as by inserting the battery 112 into the stylus. For instance, the user may purchase the stylus 102 and the companion device 104 together as a set, open the packaging, and install the battery. In other cases, the battery may already be installed and the user may simply pick up the stylus for initial use.

As shown in Instance Two, upon unwrapping the stylus 102 and powering it up, the user 114 may intuitively try to write (e.g., ink) on the companion device 104's display 106 (or otherwise interact with the display) with the stylus. As the stylus's sensing tip 110 interacts (e.g., approaches and/or touches) the display 106, sensed information can be communicated between the stylus 102 and the companion device 104 as indicated generally at 116. The sensed information can be communicated in various wireless formats, examples of which are described below. Generally, these formats rely on close proximity of the devices involved, such as within a couple of inches. For instance, the stylus 102 can generate signals that convey the sensed information and that are picked up by the companion device 104 via a proximity sensing component, such as a digitizer 118 underlying the display 106 as shown by cut-away 120.

Normally, this sensed information 116 can relate to pressure information of the sensing tip 110 on the display 106, acceleration information relating to the sensing tip, etc. However, the present implementations can include additional information with the sensed information 116. This additional information can be wireless format (e.g., protocol) identification information about other wireless capabilities of the stylus 102. For instance, the stylus may have Bluetooth capabilities, and the wireless format identification information can relate to these Bluetooth capabilities. For example, the wireless format identification information can include a Bluetooth unique identification (e.g., manufacturing identification number or Bluetooth address) or the Bluetooth unique identification can be derived from the available wireless format identification information.

In Instance Three, the companion device 104 can use the Bluetooth unique identification received with (or derived from) the sensed information to initiate Bluetooth pairing with the stylus 102 as indicated generally at 122. The stylus 102 can respond to the initial communication as indicated generally at 124 and pairing can be accomplished in accordance with Bluetooth protocols. This wireless protocol identification information can allow pairing to be accomplished without the user 114 taking any affirmative steps, such as going to a settings menu on the companion device, selecting Bluetooth, selecting an individual device, and selecting that the individual device be paired.

For purposes of explanation, Instance Three presents a graphical user interface (GUI) 126 on companion device 104 that indicates that pairing has been commenced with the stylus 102 and asks if the user wants to continue. Other implementations may simply complete the pairing without any user input and instead rely on the fact that the user is using the stylus to interact with the companion device as evidence that the user wants to pair the stylus and the companion device.

From one perspective, some of the present implementations can utilize out-of-band communications relating to display interactions to transfer information about other wireless formats of the interacting device/apparatus (e.g., stylus 102) to the display device (e.g., companion device 104). The companion device can use the information about the interacting device to establish communication over another wireless format, rather than relying on manual actions from the user to establish the communication.

FIG. 2 shows that subsequent communication can be accomplished between the stylus 102 and the companion device 104 via the second wireless format (e.g., in this case Bluetooth). For instance, as shown in Instance Four, if the user 114 subsequently picks up the stylus 102, the stylus can communicate with the companion device 104 and cause the companion device to launch a drawing application (or take another action). In this example, as shown in Instance Five, the drawing application (e.g., drawing application GUI) 202 can be launched and be ready for the user to use on the companion device 104 before the stylus 102 even approaches the companion device's display 106.

Alternatively to launching an application, the user 114 may select an 'eraser' feature on the stylus 102, and this information can be communicated to the companion device 104 so that when the stylus's sensing tip 110 approaches the display 106, visual content is erased rather than drawing/inking new content.

Figure 3:
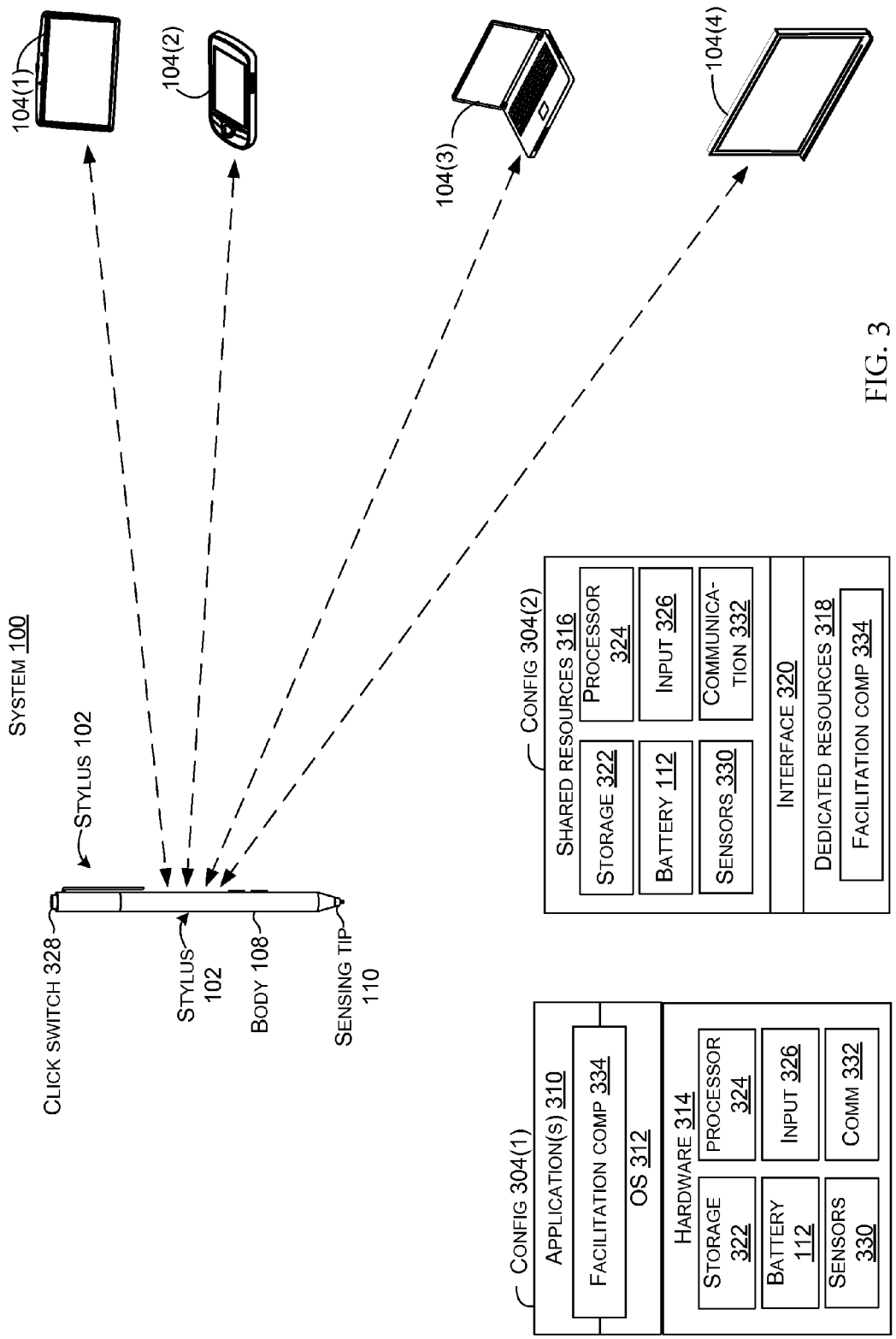
FIG. 3 shows a system example in accordance with some implementations of the present concepts.

FIG. 3 shows system 100 and offers details about stylus 102 and/or companion device 104. The stylus 102 and the companion devices 104 are in and of themselves types of computing devices. In this case, system 100 includes several example companion devices 104(1)-104(4). Companion device 104(1) is manifest as a tablet type device similar to device 104 of FIGS. 1-2, companion device 104(2) is manifest as a smart phone type device. Companion device 104(3) is manifest as a notebook computer type device and device 104(4) is manifest as a digital whiteboard type device.

Two example device configurations 304(1) and 304(2) are illustrated that can be used to implement stylus 102 and/or companion devices 104. Briefly, configuration 304(1) represents an operating system centric configuration, and configuration 304(2) represents a system on a chip configuration (SOC). Configuration 304(1) is organized into one or more applications 310, operating system 312, and hardware 314. Configuration 304(2) is organized into shared resources 316, dedicated resources 318, and an interface 320 therebetween.

In either configuration 304(1) or 304(2), the stylus 102 and/or companion device 104 can include storage/memory (e.g., computer-readable storage media) 322, a processor 324, a battery 112 (or other power source), and input assemblies 326. In this case, the input assemblies are manifest as a click switch 328. Both configurations can also include sensors 330. Examples of sensors can include: pressure sensors, proximity sensors, accelerometers, gyroscopes, inertial sensors, capacitors, magnetometers, and/or microphones, among others. A specific sensor that is discussed in detail is a pressure sensor. Either configuration can include a wireless communication component(s) 332 and/or a facilitation component 334. The communication component 332 can include transmitters and/or receivers for communicating over various electromagnetic wavelengths in compliance with various formats (e.g., protocols), such as 2.4 to 2.485 GHz in the case of Bluetooth.

The sensing tip's pressure sensors can be positioned to detect when sensing tip 110 contacts display 106. Similarly, electrostatic receivers can detect proximity of the sensing tip to a surface as the tip approaches the surface but before physical contact via capacitance or other mechanism. In some configurations, the electrostatic receivers can function as proximity detectors to the companion device 104 so that the stylus 102 can transmit proximity information and wireless format identification information to the companion device 104.

The companion device 104 can include a proximity sensing component manifest as a 'pen sensor' (e.g., a sensor 330) configured to receive the proximity information and wireless format identification information from the stylus 102. The pen sensor can be associated with the companion device's display 106 (designated in FIG. 2) or the pen sensor can be independent of the display. For instance, the pen sensor can be integrated into the display as a display component. In another case the pen sensor can be associated with the display as a separate component. For example, the display can be manufactured as a display module and then the pen sensor can be bonded to the display module in a subsequent process. In still another configuration, the pen sensor can be a component of the companion device that is not physically associated with the display.

In the illustrated configuration of the stylus 102, the sensing tip 110 protrudes from one end of the body 108. Other implementations may employ sensing tips from both ends of the body and/or within the body. Further, sensing tips can be employed on other form factors besides the illustrated 'pen-like' configuration.

The communication component 332 can allow the stylus 102 to communicate with various companion devices, such as the illustrated companion devices 104(1)-104(4). The communication component can include a receiver and a transmitter and/or other radio frequency circuitry (and/or other components, such as analog-to-digital converters, rectifiers, etc.) for communicating via various formats, such as cellular, Wi-Fi (IEEE 802.xx), Bluetooth, etc. Example communication components are described below relative to FIG. 4.

Instances of facilitation component 334 can occur on the stylus 102 and/or companion device 104. In some implementations, the facilitation component 334 can be manifest as part of the operating system 312, application 310, an application part, and/or an application program interface, among other options. The functionality performed by the facilitation components on various devices maybe similar or different. For instance, in one case, the facilitation component on the stylus 102 may simply store the wireless format identification information and cause this information to be communicated to the companion device 104. In contrast, the facilitation component 334 on the companion device may identify (or otherwise distinguish) the sensor information from the wireless format identification information, process the wireless format identification information, and cause the communication component to use the wireless format identification information to contact the stylus's communication component and begin the pairing process as defined by the Bluetooth protocol (or other protocol). Once pairing is complete, the facilitation component 334 can facilitate actions on the companion device 104 upon receiving Bluetooth communications from the stylus 102. For instance, the user 114 may select an 'erase' function on the stylus. This information can be communicated over Bluetooth communications to the companion device. The facilitation component can then cause the stylus's functionality to switch from 'draw' to 'erase' on the companion device as the user engages the display with the stylus. Of course, the facilitation component can cause other actions (whether predefined or user defined) upon receiving information from the stylus received via Bluetooth communications.

Stylus 102 and companion devices 104(1)-104(4) are considered to be computing devices. The term "device," "computer," or "computing device" as used herein can mean any type of device that has some amount of processing capability and/or storage capability. Processing capability can be provided by one or more processors 324 that can execute data in the form of computer-readable instructions to provide a functionality. Data, such as computer-readable instructions and/or user-related data, can be stored on storage 322, such as storage that can be internal or external to the computer. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and/or flash memory, among others.

As mentioned above, configuration 304(2) is considered to be a system on a chip (SOC) type design. In such a case, functionality provided by the device can be integrated on a single SOC or multiple coupled SOCs. One or more processors 324 can be configured to coordinate with shared resources 316, such as memory/storage 322, etc., and/or one or more dedicated resources 318, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 4:
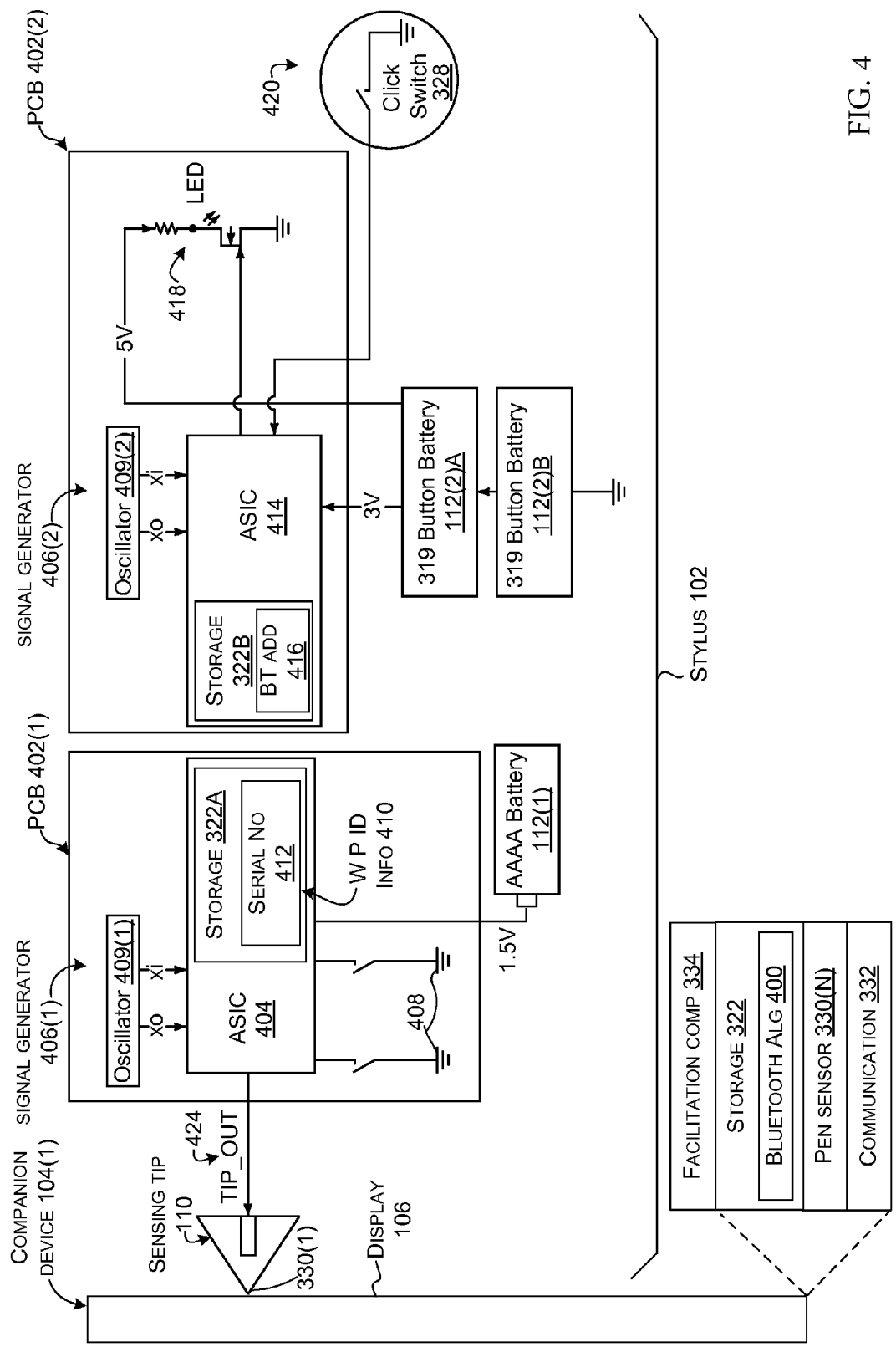
FIG. 4 shows an apparatus example in accordance with some implementations of the present concepts.

FIG. 4 shows additional details about one example SOC implementation of stylus 102. The stylus's sensing tip 110 is touching display 106 of companion device 104(1). Illustrated elements of the companion device include facilitation component 334, storage 322, a Bluetooth address generation algorithm 400, a pen sensor 330(N), and a communication component 332.

This particular implementation of stylus 102 includes two separate printed circuit boards, PCB 402(1) and PCB 402(2), powered by two separate batteries 112(1) and 112(2), though the functionality could be achieved on a single integrated PCB powered by a single battery. In this case, battery 112(1) is manifest as a AAAA battery generating 1.5 volts and battery 112(2) is manifest as two 319 button batteries connected in series to generate 3 volts.

PCB 402(1) includes an ASIC 404 and a signal generator 406(1) for generating signals of specific frequencies. Sensor tip 110 includes a pressure sensor 330(1) that is connected to the ASIC 404. The ASIC 404 is also connected to battery 112(1) and selectively to ground 408. In this case, signal generator 406(1) is manifest as an oscillator 409(1) and the ASIC 404. The ASIC 404 also includes storage 322A that has wireless protocol identification information 410 that is manifest as a device serial number 412.

PCB 402(2) includes another ASIC 414 and a signal generator 406(2) in the form of an oscillator 409(2). In this case, the ASIC 414 can function as a Bluetooth radio. The ASIC 414 can include storage 322B that has a BlueTooth random static address (BT address) 416 stored thereon. The ASIC 414 is driven by two 319 button batteries 112(2)A and 112(2)B. The batteries also drive a power on indicator assembly 418. A user activatable input assembly 420 in the form of click switch 328 is connected to the ASIC 414. ASIC 404 and the signal generator 406(1) can function as a communication component (332, FIG. 3). Similarly, ASIC 414 and signal generator 406(2) can function as a communication component, or alternatively, ASIC 404, signal generator 406(1), ASIC 414, and signal generator 406(2) can be viewed as a single communication component.

The functionality of the above introduced elements is described below. Recall that traditionally, Bluetooth pairing between the stylus 102 and the companion device 104(1) requires multiple steps to be performed by the user, such as going to a settings menu, finding the Bluetooth option, identifying the device to be paired, etc. Further, the user may not even know that the stylus has Bluetooth capabilities and thus not even know to complete the pairing process.

For introductory purposes, in this implementation, the device serial number 412 can be assigned to the stylus 102 during manufacture, such as by an entity manufacturing the stylus or a component thereof, such as the PCB 402(2). The device serial number 412 can be processed by Bluetooth address generation algorithm 400 to produce the Bluetooth address 416. Such example algorithm can be the SHA1 or SHA256 algorithm. An example application of the SHA1 Bluetooth address generation algorithm is provided below. The Bluetooth address 416 can be thought of as the over the air address or GAP address (e.g., the address used to communicate with the Bluetooth radio provided by the ASIC 414).

Example Bluetooth address generation algorithm 400:
P:=A unique identifier (e.g., device serial number 412) for the pen (e.g., stylus 102).
S:=A unique hashing seed (128 bit)
Sha1( ):=Sha1 standard algorithmic provider.
Hash=sha1(sha1(S), P);
Bt_Address |=0xc00000000000;
Bt_Address &=0xffffffffffff In the present scenario, at initial power up, the ASIC 414 can default into Bluetooth advertising mode. Other implementations using other wireless protocols can default to an advertising mode that is compliant with the individual wireless protocol. Upon interaction with display 106, the pressure sensor 330(1) can convert mechanical pressure on the sensing tip 110 to an output signal (e.g., TIP_OUT) pressure value 424. The ASIC 404 can receive the output signal pressure value 424 and represent the output signal pressure value by modulating signals generated by the signal generator 406(1). In this case, the signal generator is manifest as oscillator 409(1). The ASIC 404 can further modulate the signals generated by the signal generator 406(1) to convey device serial number 412.

The companion device's pen sensor 330(N) operating cooperatively with communication component 332 can receive the modulated signals from the signal generator 406(1) of stylus 102. The companion device's facilitation component 334 can identify portions of the signals conveying tip sensing information and portions of the signals conveying the serial number 412. The facilitation component can process the serial number 412 with the Bluetooth address generation algorithm 400 (e.g., the same algorithm that was used to generate the Bluetooth address 416 for the stylus 102). The facilitation component can compare the Bluetooth address 416 to a listing of Bluetooth devices (stored in storage 322) that the companion device has already paired with. If the stylus is already on the list of paired devices, the facilitation component can stop processing. If this is the initial use of the stylus 102 with the companion device 104(1) (e.g., the stylus is not on the list of paired devices), the facilitation component can cause the communication component to use the Bluetooth address 416 to contact the stylus 102. The communication component can then communicate with the stylus in accordance with Bluetooth pairing protocols to complete the pairing. Once pairing is complete, the user can use click switch 328 to control the companion device 104(1). For instance, the user may use the click switch to launch an application, switch stylus contact from 'drawing' to 'erasing', or 'add a note,' among others.

From one perspective, the Bluetooth address 416 (e.g., GAP address) generated from serial number 412 (e.g., Pen ID) can be used to enable out of band pairing since the serial number can be communicated to the companion device operating system (312, FIG. 3) via stylus human interface device (HID) reports when the stylus's sensing tip 110 is interacting with the display 106 of the companion device 104(1). An operating system driver or application can decode the serial number to the Bluetooth address using the same Bluetooth address generation algorithm and initiate the pairing process by passing the Bluetooth address to the appropriate operating system pairing application program interface (API). If the Bluetooth address decoded from the serial number is already paired, then it can stop the process. Similar implementations can be accomplished for other wireless formats/protocols.

In this implementation, the serial number 412 can be smaller (e.g., less bytes) than the Bluetooth address 416. Thus, communicating the serial number 412 to the companion device 104(1) rather than the Bluetooth address 416 is less resource intensive for the stylus 102. The companion device 104(1) thus obtains the Bluetooth address indirectly by processing the received serial number 412 with the Bluetooth address generation algorithm 400, such as the above mentioned SHA1 or SHA256. Other implementations can instead convey the Bluetooth address directly to the companion device via signal generator 406(1).

Example Methods

Figures 5, 6:
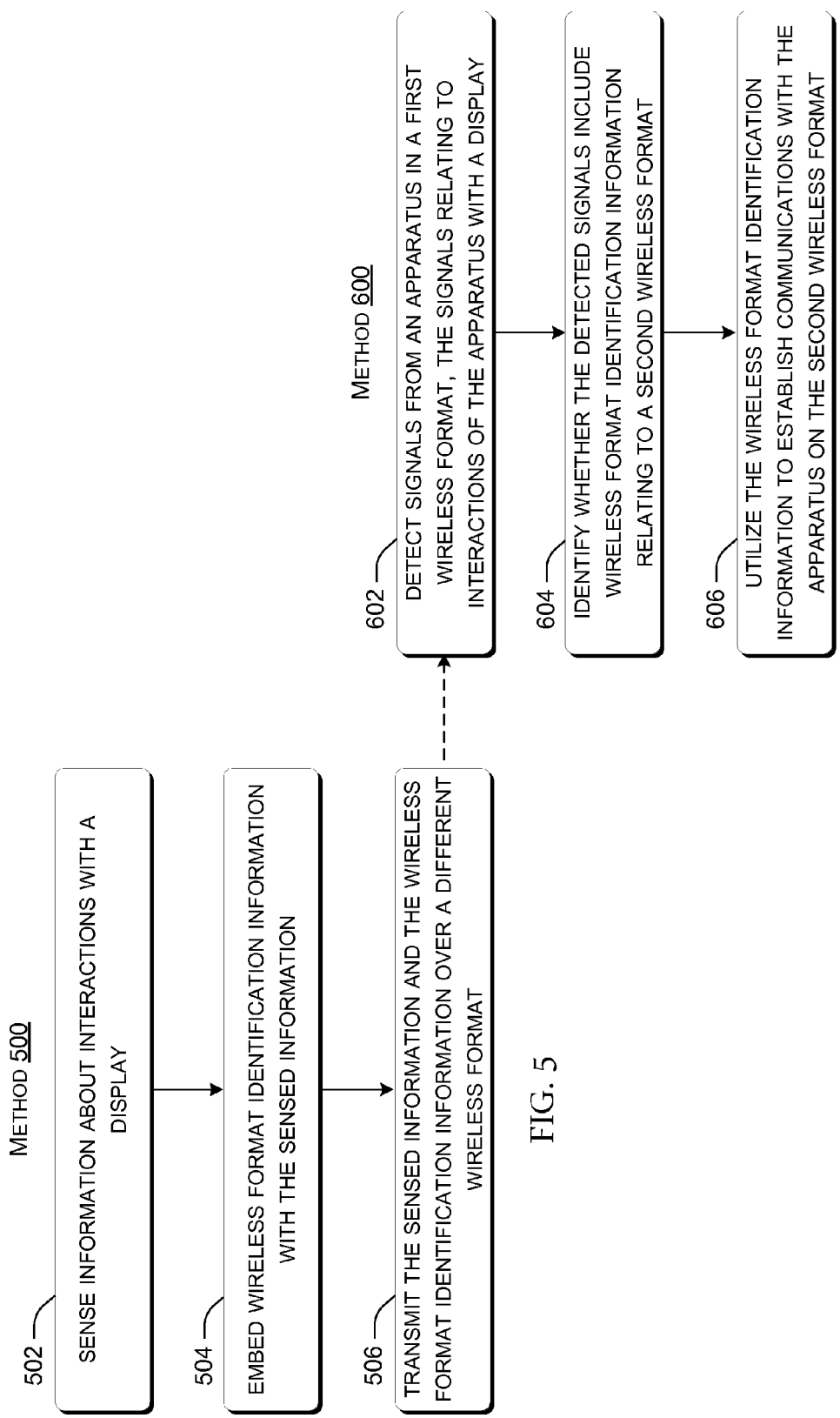
FIGS. 5-6 show example flow charts in accordance with some implementations of the present concepts.

FIG. 5 illustrates a flowchart of a method or process 500 that is consistent with at least some implementations of the present concepts.

At block 502, the method can sense information about interactions with a display.

At block 504, the method can embed wireless format identification information with the sensed information.

At block 506, the method can transmit the sensed information and the wireless format identification information over a different wireless format.

FIG. 6 illustrates a flowchart of a method or process 600 that is consistent with at least some implementations of the present concepts.

At block 602, the method can detect signals from an apparatus/device in a first wireless format, the signals can relate to interactions of the apparatus with a display. In one case, the apparatus is manifest as a stylus.

At block 604, the method can identify whether the detected signals include wireless format identification information relating to a second wireless format.

At block 606, the method can utilize the wireless format identification information to establish communications with the apparatus on the second wireless format.

The described methods or processes can be performed by the systems and/or devices described above, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a processor of a computer device causes the computer device to perform the method.

Further Examples

The above discussion relates to device pairing and includes multiple examples and additional examples are described below. One example can include a system that includes a stylus and a computing device. The computing device has a display and is configured to communicate in accordance with a wireless protocol. The stylus is configured to transmit proximity information to the computing device when a user brings a tip of the stylus proximate to the display and is configured to supply wireless protocol identification information with the proximity information. The computing device is configured to pair with the stylus over the wireless protocol using the wireless protocol identification information without requiring any additional action from the user on the computing device or the stylus.

Another example can include any combination of the above and/or below examples where the stylus is configured to transmit the proximity information when the user hovers the tip over the display.

Another example can include any combination of the above and/or below examples where the computing device comprises a sensor configured to receive the wireless protocol identification information and the proximity information.

Another example can include any combination of the above and/or below examples where the sensor is associated with the display or wherein the sensor is not associated with the display.

Another example can include any combination of the above and/or below examples where the stylus is configured to transmit the proximity information when the user touches the tip to the display and where the proximity information comprises pressure information and further comprises a signal generator that is configured to generate a signal that transmits the pressure information electrostatically.

Another example can include any combination of the above and/or below examples where the signal generator comprises an oscillator that generates a specific frequency signal and where the pressure information and the wireless protocol identification information are conveyed by modulating the specific frequency signal.

Another example can include any combination of the above and/or below examples where the oscillator is powered by a battery on the stylus or where the oscillator is powered inductively by a digitizer positioned proximate to the display on the computing device.

Another example can include any combination of the above and/or below examples where the computing device comprises a communication component configured to communicate over multiple wireless protocols including Wi-Fi or Bluetooth.

Another example can include any combination of the above and/or below examples where the computing device further includes a communication component and a facilitation component, the facilitation component being configured to isolate the wireless protocol identification information from the proximity information and to cause the communication component to initiate a pairing process with the stylus in accordance with the wireless protocol using the wireless protocol identification information.

Another example can include any combination of the above and/or below examples where the wireless protocol identification information comprises a Bluetooth address of the stylus based upon a manufacturing identification number.

Another example can include any combination of the above and/or below examples where the computing device is a tablet type computing device, a smartphone type computing device, a digital whiteboard, or a notebook type computing device.

Another example can include a computing device that includes a housing that is graspable by a user and a sensing tip positioned relative to the housing. The sensing tip is configured to sense information relating to an interaction of the sensing tip with a display of a companion display device. The computing devise further includes a first signal generator configured to communicate with the companion display device via wireless signals that comply with a wireless protocol and a second signal generator configured to communicate with the companion display device via other wireless signals that are a different frequency than the wireless signals and that convey at least some of the sensed information about the interaction with the display to the companion display device. The other wireless signals also convey information about the computing device that facilitates pairing of the computing device and the companion display device in accordance with the wireless protocol.

Another example can include any combination of the above and/or below examples where the housing extends between opposing first and second ends and where the sensing tip protrudes from the first end, or where the sensing tip is contained within the housing, or where the sensing tip protrudes from the first end and a second sensing tip protrudes from the second end.

Another example can include any combination of the above and/or below examples where the first signal generator is further configured to operate in a wireless protocol compliant advertising mode upon being powered on by the user.

Another example can include any combination of the above and/or below examples where the sensing tip comprises a pressure sensor or where the sensing tip does not include a pressure sensor, or where the sensing tip comprises a proximity sensor, or where the sensing tip includes a proximity sensor and a pressure sensor.

Another example can include any combination of the above and/or below examples where the information about the computing device comprises a unique identification of the computing device.

Another example can include any combination of the above and/or below examples where the information about the computing device that facilitates pairing of the computing device and the companion computing device in accordance with the wireless protocol comprises a Bluetooth address of the computing device based upon a manufacturing identification number.

Another example can include any combination of the above and/or below examples where the wireless protocol comprises Bluetooth or wherein the wireless protocol comprises Wi-Fi.

Another example can include any combination of the above and/or below examples where the sensed information about the interaction with the display to the companion display device comprises inking information about contact and pressure of the sensing tip on the display.

Another example can include any combination of the above and/or below examples where the computing device comprises a stylus.

Another example can include a computing device that includes a display, a wireless communication component configured to communicate with other devices in accordance with a wireless protocol, and a proximity sensing component configured to sense wireless signals from an individual other device that convey information about a tip of the individual other device relative to the display. The computing device further includes a facilitation component configured to analyze the wireless signals to identify other information about the individual other device contained in the wireless signals and to use the other information to cause the wireless communication component to pair with the individual other device in compliance with the wireless protocol.

Another example can include any combination of the above and/or below examples where the facilitation component is part of an operating system of the computing device or part of an application operating on the computing device.

Another example can include any combination of the above and/or below examples where the facilitation component is further configured to monitor for subsequent communications from the paired individual other device over the wireless protocol and to perform an action responsive to detecting the subsequent communications.

Another example can include any combination of the above and/or below examples where the proximity sensing component comprises a pen sensor.

CONCLUSION

Although techniques, methods, devices, systems, etc., pertaining to out-of-band device pairing are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
a computing device having a display and configured to communicate in accordance with a wireless protocol; and
a stylus configured to:
when a user brings a tip of the stylus proximate to the display, modulate sensed information sensed by the stylus together with wireless protocol identification information to form a modulated signal representing the sensed information and the wireless protocol identification information; and
transmit the modulated signal representing the sensed information and the wireless protocol identification information to the computing device,
the computing device being configured to:
isolate the wireless protocol identification information in the modulated signal from the sensed information; and
initiate a pairing process with the stylus in accordance with the wireless protocol using the wireless protocol identification information, the pairing process being initiated without requiring any additional action from the user on the computing device or the stylus.

2. The system of claim 1, wherein the sensed information comprises proximity information, and the stylus is configured to transmit the sensed information when the user hovers the tip over the display.

3. The system of claim 1, wherein the stylus is configured to transmit the sensed information when the user touches the tip to the display and wherein the sensed information comprises pressure information.

4. The system of claim 3, wherein the stylus comprises an oscillator configured to modulate the sensed information together with the wireless protocol identification information.

5. The system of claim 4, wherein the oscillator is powered by a battery on the stylus or wherein the oscillator is powered inductively by a digitizer positioned proximate to the display on the computing device.

6. The system of claim 1, wherein the computing device comprises a sensor configured to receive the wireless protocol identification information and the sensed information.

7. The system of claim 6, wherein the sensor is associated with the display.

8. The system of claim 1, wherein the wireless protocol identification information comprises a Bluetooth address of the stylus that is based at least upon a manufacturing identification number.

9. The system of claim 1, wherein the computing device is a tablet type computing device, a smartphone type computing device, a digital whiteboard, or a notebook type computing device.

10. The computing device of claim 1, the tip of the stylus comprising a sensing tip configured to sense the sensed information.

11. A computing device comprising:
a display;
a processor; and
a computer-readable storage medium storing instructions which, when executed by the processor, cause the processor to:
receive, from a stylus, a modulated signal comprising both sensor information and wireless protocol identification information for a particular wireless protocol, the sensor information being sensed by the stylus when in proximity to the computing device and the wireless protocol identification information identifying the stylus;
process the modulated signal to distinguish the sensor information in the modulated signal from the wireless protocol identification information in the modulated signal; and
initiate a pairing process with the stylus in accordance with the particular wireless protocol using the wireless protocol identification information.

12. The computing device of claim 11, wherein the wireless protocol identification information comprises an identifier of the stylus other than a wireless protocol address of the stylus, and the wireless protocol address of the stylus can be derived from the identifier of the stylus.

13. The computing device of claim 12, wherein the identifier is a serial number of the stylus.

14. The computing device of claim 13, wherein the instructions, when executed by the processor, cause the processor to:
process the serial number of the stylus with an address generation algorithm to determine the wireless protocol address of the stylus for use in the particular wireless protocol.

15. The computing device of claim 14, wherein the instructions, when executed by the processor, cause the processor to:
perform the address generation algorithm by applying a hashing operation to the serial number using a hashing seed.

16. A system comprising the computing device of claim 11 and the stylus.

17. The system of claim 16, the stylus comprising a pressure sensor configured to provide pressure signals, the sensor information reflecting the pressure signals.

18. The system of claim 16, the stylus comprising an acceleration sensor configured to provide acceleration signals, the sensor information reflecting the acceleration signals.

19. A method performed by a computing device, the method comprising:
receiving, from a stylus, a modulated signal that has been modulated by the stylus to include both sensed information sensed by the stylus and wireless protocol identification information that identifies the stylus for a particular wireless protocol;
identifying a first portion of the modulated signal conveying the sensed information and a second portion of the modulated signal conveying the wireless protocol identification information;
obtaining the wireless protocol identification information from the second portion of the modulated signal; and
initiating a pairing process with the stylus in accordance with the particular wireless protocol using the wireless protocol identification information obtained from the second portion of the modulated signal.

20. The method of claim 19, further comprising:
determining an identifier of the stylus provided in the second portion of the modulated signal; and
deriving a wireless address of the stylus based at least on the identifier of the stylus.

21. The method of claim 20, further comprising:
comparing the wireless address of the stylus to a list of already-paired devices that are already paired to the computing device; and
initiating the pairing process when the wireless address of the stylus does not appear in the list of already-paired devices.

22. The method of claim 21, further comprising:
not initiating the pairing process when the wireless address of the stylus appears in the list of already-paired devices.

23. The method of claim 22, the particular wireless protocol comprising Bluetooth.

24. The method of claim 23, the deriving the wireless address comprising performing a Bluetooth address generation algorithm.

25. The computing device of claim 10, the sensed information comprising at least one of pressure information reflecting pressure sensed by the sensing tip of the stylus or proximity information sensed by the sensing tip of the stylus.

26. A stylus comprising:
a sensing tip configured to sense pressure applied to the sensing tip or proximity of the stylus to a surface of a computing device;
a first signal generator configured to communicate with the computing device via wireless signals that comply with a particular wireless protocol; and
a second signal generator configured to:
obtain sensed information from the sensing tip, the sensed information reflecting the pressure applied to the sensing tip or the proximity of the stylus to the surface of the computing device;
retrieve a wireless identifier of the stylus, the wireless identifier pertaining to the particular wireless protocol;
modulate both the sensed information and the wireless identifier together into a modulated signal; and communicate the modulated signal to the computing device,
the first signal generator being further configured to perform a pairing process with the computing device, the computing device initiating the pairing process responsive to receiving the modulated signal from the second signal generator.

* * * * *